(12) United States Patent
Conrad (10) Patent No.: US 6,582,489 B2
(45) Date of Patent: *Jun. 24, 2003

(54) METHOD AND APPARATUS OF PARTICLE TRANSFER IN MULTI-STAGE PARTICLE SEPARATORS

(75) Inventor: Wayne Ernest Conrad, Hampton (CA)

(73) Assignee: Polar Light Limited, Tai Po (HK)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,534

(22) Filed: Dec. 20, 2001

(65) Prior Publication Data

US 2002/0043055 A1 Apr. 18, 2002

Related U.S. Application Data (63) Continuation of application No. 09/595,175, filed on Jun. 16, 2000, now Pat. No. 6,344,064, which is a continuation-in-part of application No. 09/239,860, filed on Jan. 29, 1999, now Pat. No. 6,334,234.

(51) Int. Cl.[7] .......................... B01D 45/16; B01D 50/00
(52) U.S. Cl. ............................. 55/337; 55/343; 55/349; 55/429; 55/433; 55/472; 55/459.1; 55/DIG. 3; 15/350; 15/352
(58) Field of Search .......................... 55/337, 342, 343, 55/345, 346, 349, 429, 432, 433, 459.1, 472, DIG. 3; 15/350, 352

(56) References Cited

U.S. PATENT DOCUMENTS

| | | |
|---|---|---|
| 1,416,995 A | 5/1922 | Stroud |
| 2,553,175 A | 5/1951 | Davenport et al. |
| 2,604,956 A | 7/1952 | Israel |
| 2,804,171 A | 8/1957 | Yellott et al. |
| 3,425,192 A | 2/1969 | Davis |
| 4,049,400 A | 9/1977 | Bennett et al. |
| 4,229,187 A | 10/1980 | Stockford et al. |
| 4,344,776 A | 8/1982 | Yavnieli |
| 4,373,228 A | 2/1983 | Dyson |
| 4,406,678 A | 9/1983 | Neugart |
| 4,518,402 A | 5/1985 | Dargel |
| 4,571,772 A | 2/1986 | Dyson |
| 4,573,236 A | 3/1986 | Dyson |
| 4,593,429 A | 6/1986 | Dyson |
| RE32,257 E | 10/1986 | Dyson |
| 4,643,748 A | 2/1987 | Dyson |
| 4,749,386 A | 6/1988 | Strohmeyer et al. |
| 4,826,515 A | 5/1989 | Dyson |
| 4,828,586 A | 5/1989 | Joannou |
| 4,853,008 A | 8/1989 | Dyson |
| 4,853,011 A | 8/1989 | Dyson |
| 4,902,306 A | 2/1990 | Burnett et al. |
| 5,062,870 A | 11/1991 | Dyson |
| 5,069,691 A | 12/1991 | Travis et al. |
| 5,078,761 A | 1/1992 | Dyson |
| 5,090,976 A | 2/1992 | Dyson |
| 5,143,524 A | 9/1992 | Inculet et al. |

(List continued on next page.)

FOREIGN PATENT DOCUMENTS

| | | |
|---|---|---|
| CA | 2221499 | 11/1995 |
| EP | 0 815 788 A2 | 7/1998 |
| EP | 0 815 788 A3 | 3/1999 |
| EP | 0 908 121 A1 | 4/1999 |
| WO | WO 88 08269 | 11/1988 |
| WO | WO 99 34722 | 7/1999 |
| WO | WO 00 42292 | 7/2000 |

OTHER PUBLICATIONS

Patent Abstracts of Japan, vol. 1997, No. 04, Apr. 30, 1997 (JP 08 322768).

Primary Examiner—Robert A. Hopkins
(74) Attorney, Agent, or Firm—Philip C. Mendes da Costa; Bereskin & Parr (57) ABSTRACT

An improved two-stage separator uses reusable containers for collecting particles separated by each separation stage. The reusable containers are constructed such that a user empties both reusable containers by the actions required to empty just one of the reusable containers.

22 Claims, 10 Drawing Sheets

U.S. PATENT DOCUMENTS

| | | |
|---|---|---|
| 5,145,499 A | 9/1992 | Dyson |
| 5,160,356 A | 11/1992 | Dyson |
| 5,230,723 A | 7/1993 | Travis et al. |
| 5,254,147 A | 10/1993 | Finke |
| 5,255,411 A | 10/1993 | Da Costa |
| 5,259,854 A | 11/1993 | Newman |
| 5,267,371 A | 12/1993 | Soler et al. |
| 5,307,538 A | 5/1994 | Rench et al. |
| 5,336,299 A | 8/1994 | Savell |
| 5,358,290 A | 10/1994 | Fleet et al. |
| 5,376,168 A | 12/1994 | Inculet |
| 5,400,465 A | 3/1995 | Bosses |
| 5,405,434 A | 4/1995 | Inculet |
| 5,433,763 A | 7/1995 | Shagott et al. |
| 5,558,697 A | 9/1996 | Dyson et al. |
| 5,574,493 A | 11/1996 | Sanger et al. |
| 5,593,479 A | 1/1997 | Frey et al. |
| 5,656,063 A | 8/1997 | Hsu |
| 5,725,623 A | 3/1998 | Bowerman et al. |
| 5,846,302 A | 12/1998 | Putro |
| 6,238,451 B1 | 5/2001 | Conrad et al. |

METHOD AND APPARATUS OF PARTICLE TRANSFER IN MULTI-STAGE PARTICLE SEPARATORS

This application is a continuation of U.S. patent application Ser. No. 09/595,175 filed Jun. 16, 2000, now U.S. Pat. No. 6,344,064, which is a continutation-in-part application of U.S. patent application Ser. No. 09/239,860 filed Jan. 29, 1999, now U.S. Pat No. 6,334,234.

FIELD OF THE INVENTION

The present invention relates generally to the transfer and removal of particles separated in multi-stage separators such as may be used by vacuum cleaners. In one particular application, the invention relates to the multi-stage separation having upstream and downstream separation stages wherein the position at which the separated particles exit from the downstream separation stage is positioned above the position at which the separated particles exit the upstream separation stage.

BACKGROUND OF THE INVENTION

The use of multiple cyclones connected in parallel or series has long been known to be advantageous in the separation of particulate matter from a fluid stream. Typically, a relatively high speed fluid stream is introduced tangentially to a generally cylindrical or frusto-conical first stage cyclone separator, wherein the dirty air stream is accelerated around the inner periphery of the first stage cyclone separator. Fluid exiting the first stage cyclone separator is fed to the inlet of a second stage cyclone separator wherein the described separation process is repeated. Typically, successive separators are configured to remove ever-smaller particles from the fluid stream, until a desired cleaning efficiency is achieved. Particulate matter disentrained from the fluid flow is typically collected at the bottom of each stage.

Figure 1:
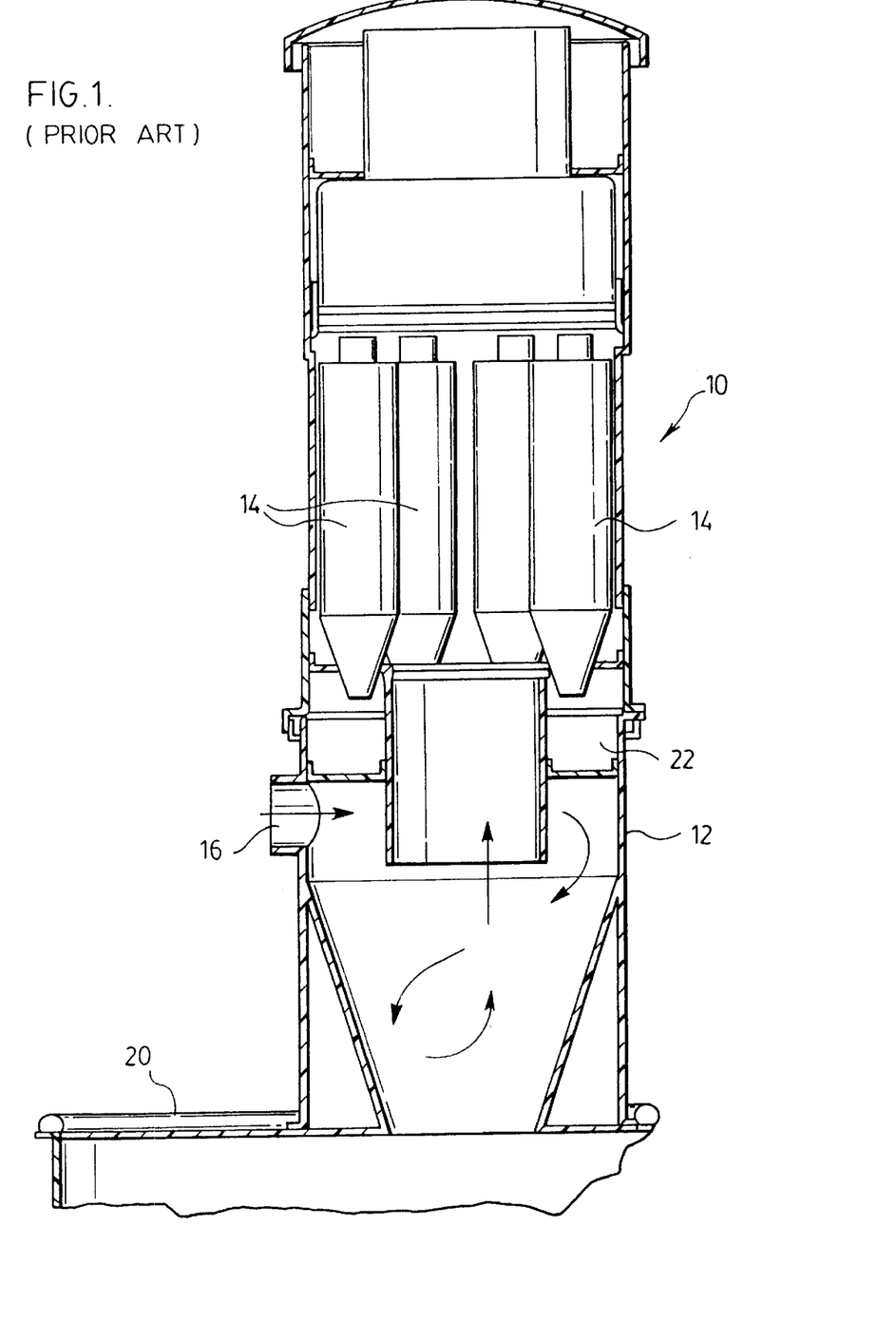
FIG. 1 is a vertical cross section through a multi-stage cyclonic separator according to the prior art.

The advantages of multi-stage cyclonic separation are disclosed in U.S. Pat. No. 3,425,192 to Davis. As shown in FIG. 1, multi-stage separator 10 essentially comprises a large, lower first stage cyclone separator 12 connected in series with a plurality of smaller, parallel second stage cyclone separators 14 disposed over cyclone separator 12. A motor (not shown) draws air through a cleaning head and into a dirty air inlet 16 of the first stage cyclone separator 12. From first stage cyclone separator 12, the air flows into second stage cyclone separators 14 and, from there, continues on through the vacuum motor to a clean air exhaust port (not shown). Particles separated from the fluid flow are deposited by first stage cyclone separator 12 into a primary collector 20, while particles separated from the fluid flow by second stage cyclone separators 14 are deposited into a secondary collector 22, vertically disposed over primary collector 20. When primary and/or secondary collectors 20 and 22 become laden with deposited particles, and must therefore be emptied, two distinct emptying steps are required to clear the collectors of their contents.

SUMMARY OF THE INVENTION

In accordance with the instant invention, there is provided a vacuum cleaner comprising a cleaner head having a dirty air inlet; and, a casing having a filtration member, the filtration member having an inlet in fluid flow communication with the dirty air inlet and an outlet in fluid flow communication with a source of suction, the filtration member comprising at least one upstream particle separator having an associated upstream particle collector and at least one downstream particle separator having an associated downstream particle collector, the particle collectors are configured such that the downstream particle collector is emptied by transferring its contents into the upstream particle collector.

In one embodiment, at least a portion of the upstream particle separator is removable from the casing and the downstream particle collector is emptied into the upstream particle collector when the when the portion of the upstream particle collector is removed from the casing.

In another embodiment, the vacuum cleaner further comprises a particle transfer member positioned between one of the particle separation members and its associated particle collector whereby particles separated by the said particle separation member are conveyed to said particle collector.

In another embodiment, at least a portion of the particle transfer member is angled downwardly whereby particles travel to said particle collector at least partially under the influence of gravity.

In another embodiment, the downstream particle separation member is chosen from the group of a cyclone, a Prandtl layer turbine and an electrostatic filter.

In another embodiment, the downstream particle collector is positioned in the upstream particle separation member.

In another embodiment, the downstream particle collector is pivotally mounted above the upstream particle collector.

In another embodiment, the downstream particle collector has side walls and a bottom that is mounted for movement between a closed position and an open position and the bottom moves to the open position as the upstream particle collector is prepared for emptying.

In another embodiment, the bottom is maintained in the closed position by interaction between the bottom and a member positioned on a portion of the vacuum cleaner that is not removed with the upstream particle collector.

In another embodiment, the downstream particle collector is disposed adjacent the upstream particle separation member.

In accordance with another aspect of the instant invention, there is provided a separator for separating entrained particles from a fluid flow, the separator comprising a first particle separation member; a reusable particle collector disposed beneath the particle separation member, the particle collector having a moveable member movably mounted between a closed position and an open position; and, a particle receiving chamber disposed beneath the particle collector, wherein when the moveable member moves from its closed position to its open position, particles collected in the particle collector are substantially transferred to the particle receiving chamber.

In accordance with another aspect of the instant invention, there is provided a separator comprising an inlet in fluid flow communication with a source of fluid having particles therein; a particle separation member; a first particle collector disposed below the particle separation member; and, a particle transfer member positioned between the particle separation member and the particle collector whereby particles separated by the particle separation member are conveyed to the particle collector.

In accordance with another aspect of the instant invention, there is provided a separator for separating entrained particles from a fluid flow, the separator comprising first separating means for separating particles from the fluid flow; second separating means for separating particles from the fluid flow; first particle collecting means for collecting particles separated from the fluid flow by the first separating means; second particle collecting means for collecting particles separated from the fluid flow by the second separating means; and, directing means for directing particles from the first particle separating means to the first particle collecting means.

BRIEF DESCRIPTION OF THE DRAWINGS

For a better understanding of the present invention, and to show more clearly how it may be carried into effect, reference will now be made by way of example to the accompanying drawings.

The drawings show a preferred embodiment of the present invention, in which.

DETAILED DESCRIPTION OF THE PREFERRED EMBODIMENT

The present invention relates to multi-stage particle separation systems wherein the particles separated in a second (or downstream) separation stage are transported to a position wherein they may be removed from the multi-stage particle separation systems together with the particles separated in a first (or upstream) separation stage. The improvements may be used in any multi-stage separation system wherein material separated by a second stage separation process is to be stored in a storage container which is to be periodically emptied. The downstream separation stage may use any separation technique, eg a cyclone separator, a Prandtl layer turbine, an electrostatic precipitator or the like, which produces separated particles that must be handled in such a way that they will not be re-entrained in fluid flowing through the downstream separation stage (eg, stored in a reusable container). Preferably, the downstream and the upstream separation stages use such separation techniques.

The preferred embodiment of the present invention is described in its use with a vacuum cleaner and in particular an upright vacuum cleaner. It will be appreciated that the improvements in multi-stage separation described herein may be used with canister vacuum cleaners, back pack vacuum cleaners, central vacuum cleaner systems as well as single and multi-stage separators of any sort, including industrial dust or particle collection systems wherein particles are to be removed from a fluid (i.e. a liquid and/or a gas).

Figure 2:
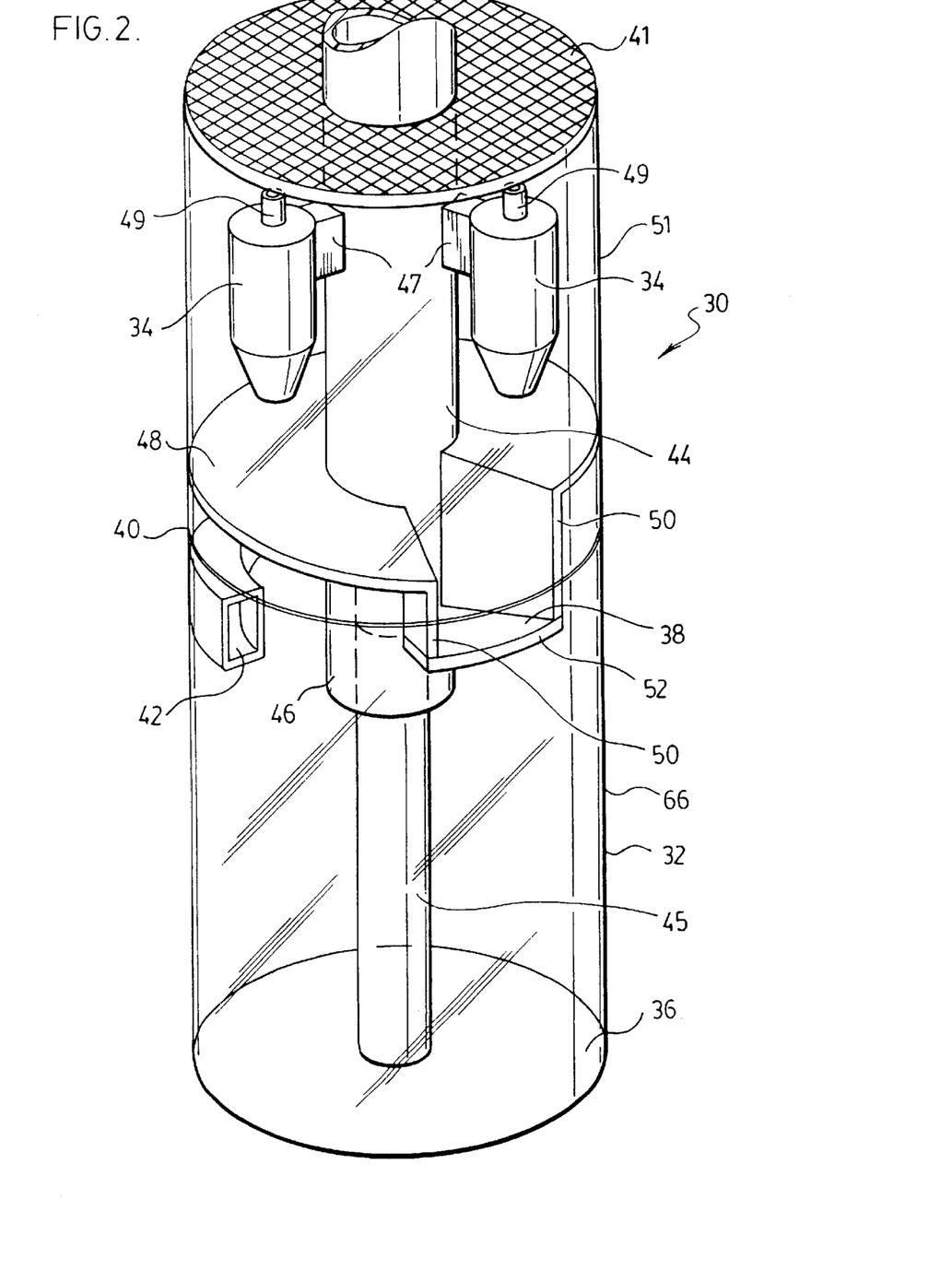
FIG. 2 is a perspective view of a multi-stage separator according to the present invention.

An improved multi-stage separator according to the present invention is shown generally in the Figures at 30. Referring to FIG. 2, separator 30 comprises a first stage cyclone 32 and a plurality of second stage cyclones 34. First stage cyclone 32 has a first stage collector 36 and second stage cyclones 34 have a second stage collector 38. First stage cyclone 32 and second stage cyclones 34 are housed within a housing 40 having a top 41, a lower portion comprising container 66 and an upper portion comprising second stage assembly 51. As shown in FIG. 2, top 41 comprises a mesh screen that is positioned upstream of a motor driven fan. However, it will be appreciated that second stage assembly 51 may be open or it may be closed if it is provided with a fluid outlet. First stage cyclone 32 has an fluid inlet 42, fed by a fluid feed conduit 45, and a fluid outlet 46. Fluid outlet 46 feeds a transfer conduit 44 which is in fluid communication with a plurality of second stage cyclones 34 via a plurality of inlets 47. Second stage cyclones 34 each have a fluid outlet 49 positioned beneath mesh screen 41.

As shown in FIG. 2, transfer conduit 44 extends above mesh screen 41 to engage a support member (not shown) to fix second stage cyclones 34 in position. The interior of conduit 44 is sealed to cause the air to enter second stage cyclones 43. Alternately, transfer conduit 44 may terminate at inlets 47 and alternate support means may be provided to position second stage cyclones 34 in second stage assembly 51 (eg. by means of support members attached to the inner wall of second stage assembly 51).

While the first and second stages are connected in series, it will be appreciated that the improvements disclosed herein may be used in a system wherein the first and second stages are connected in parallel. It will also be appreciated that additional separation stages may be positioned upstream, downstream or both upstream and downstream from the first and second separation stages. It will further be appreciated that first stage cyclone 32 may comprise a plurality of cyclones and/or that the second stage may comprise only one second stage cyclone 34 (see for example FIG. 7). The fluid may be propelled through separator 30 by any means known in the art. For example, a pump may be positioned upstream of separator 30 or, in the case of a vacuum cleaner, a source of suction (eg. a motor driven fan) may be positioned downstream from separator 30.

Figure 3A:
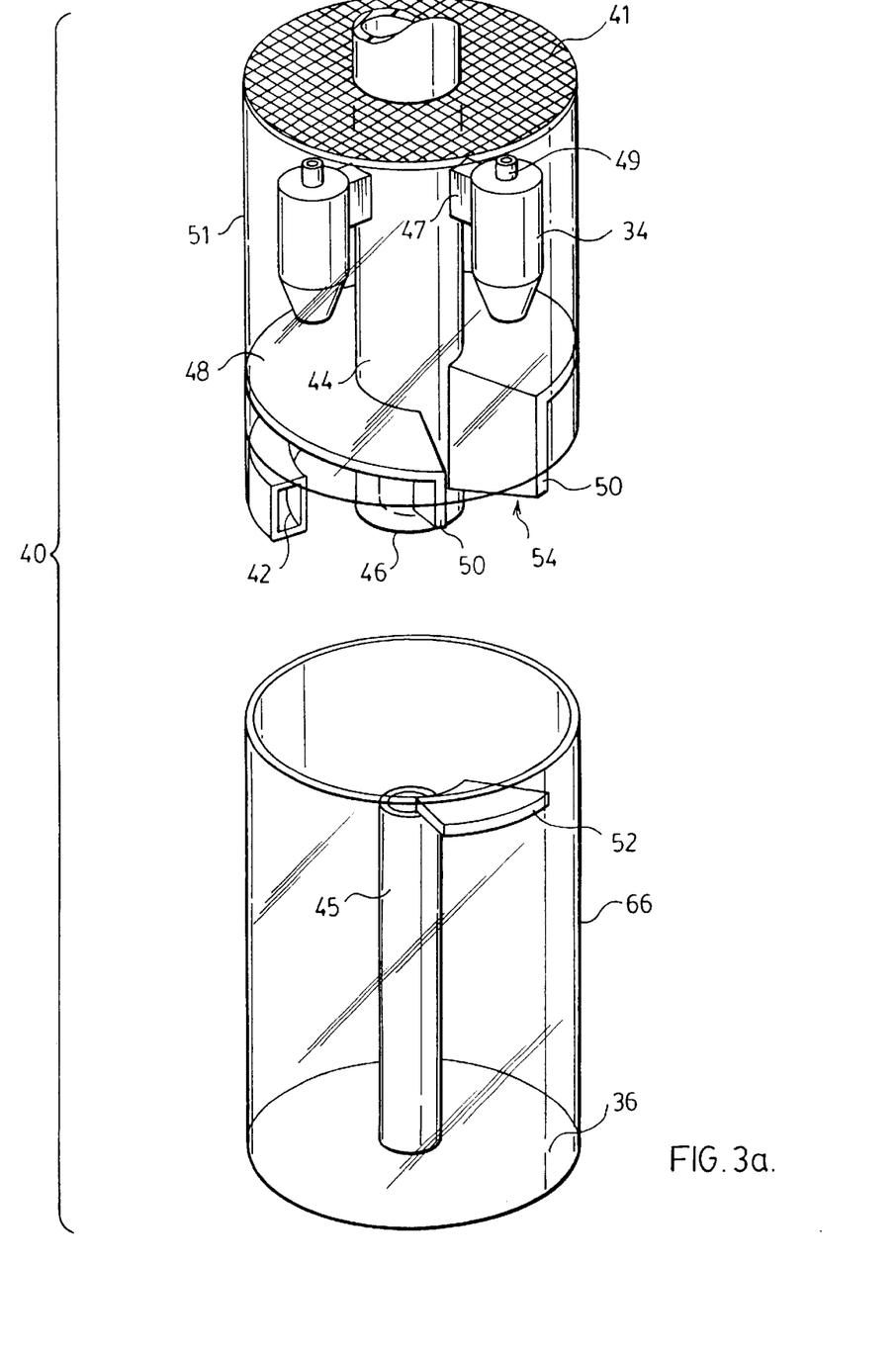
FIG. 3a is an exploded perspective view of the multi-stage separator of FIG. 2.

Beneath second stage cyclones 34 is a particle transfer member 48 which slopes downwardly to second stage collector 38. Second stage collector 38 has side walls 50 and a bottom 52. Referring to FIG. 3a, bottom 52 is separable from side walls 50.

In the embodiment wherein separator 30 is used in a vacuum cleaner (see, for example, FIG. 5), a motor-driven fan draws particle-laden fluid via a feed conduit into first stage inlet 42 via fluid feed conduit 45. The fluid flows cyclonically within a first stage cyclone 32 depositing particles in first stage collector 36 (which may be the bottom surface of container 66). The fluid exits first stage cyclone 32 via outlet 46 and is delivered by conduit 44 to the inlets 47 of second stage cyclones 34. Cyclonic flow in second stage cyclones 34 further separates particles from the fluid flow, which particles fall on to particle transfer member 48 for transfer to second stage collector 38. The fluid flow then exits second stage cyclones 34 via outlets 49, and is expelled from separator 30. The separated particles travel under the influence of gravity along particle transfer member 48 to second stage collector 38.

Preferably, as shown in FIG. 2, transfer member 48 comprises a helical ramp which slopes downwardly, around centre conduit 44, to second stage collector 38. Transfer member 48 is preferably angled sufficiently to cause the particles to slide easily down transfer member 48 to second stage collector 38 under the influence of gravity without substantially collecting on the surface of transfer member 48. Preferably, the motor-driven fan is mounted as part of the casing in which separator 30 is mounted. Accordingly, vibration from the operation of the motor-driven fan may assist the particles to travel along particle transfer member 48 under the influence of gravity (in which case particle transfer member may be at a lesser incline).

Figure 3B:
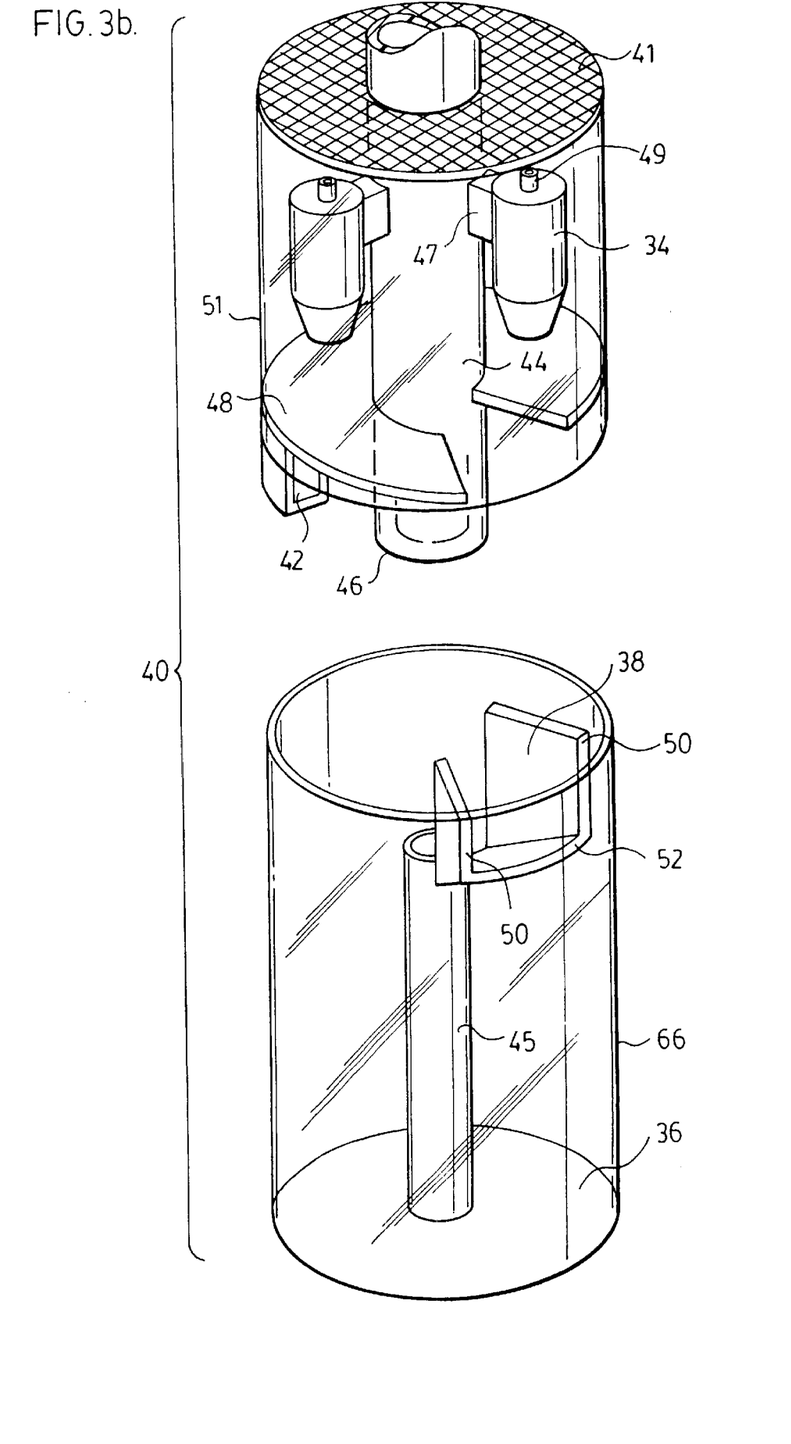
FIG. 3b is an exploded perspective view of an alternate embodiment of the multi-stage separator of FIG. 2.
Figure 6:
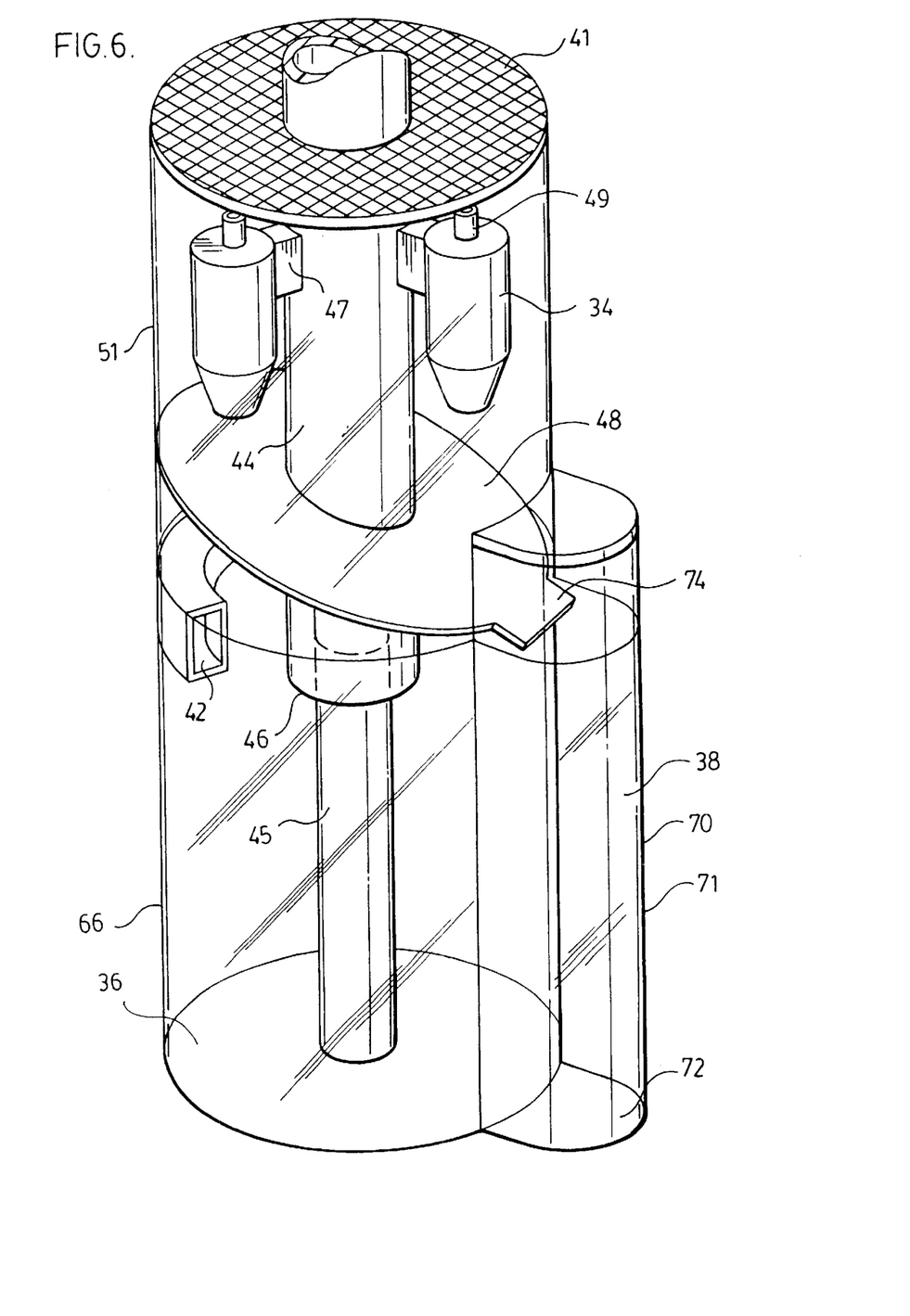
FIG. 6 is a perspective view of an alternate embodiment of a multi-stage separator having a particle transfer member according to the present invention.
Figure 7:
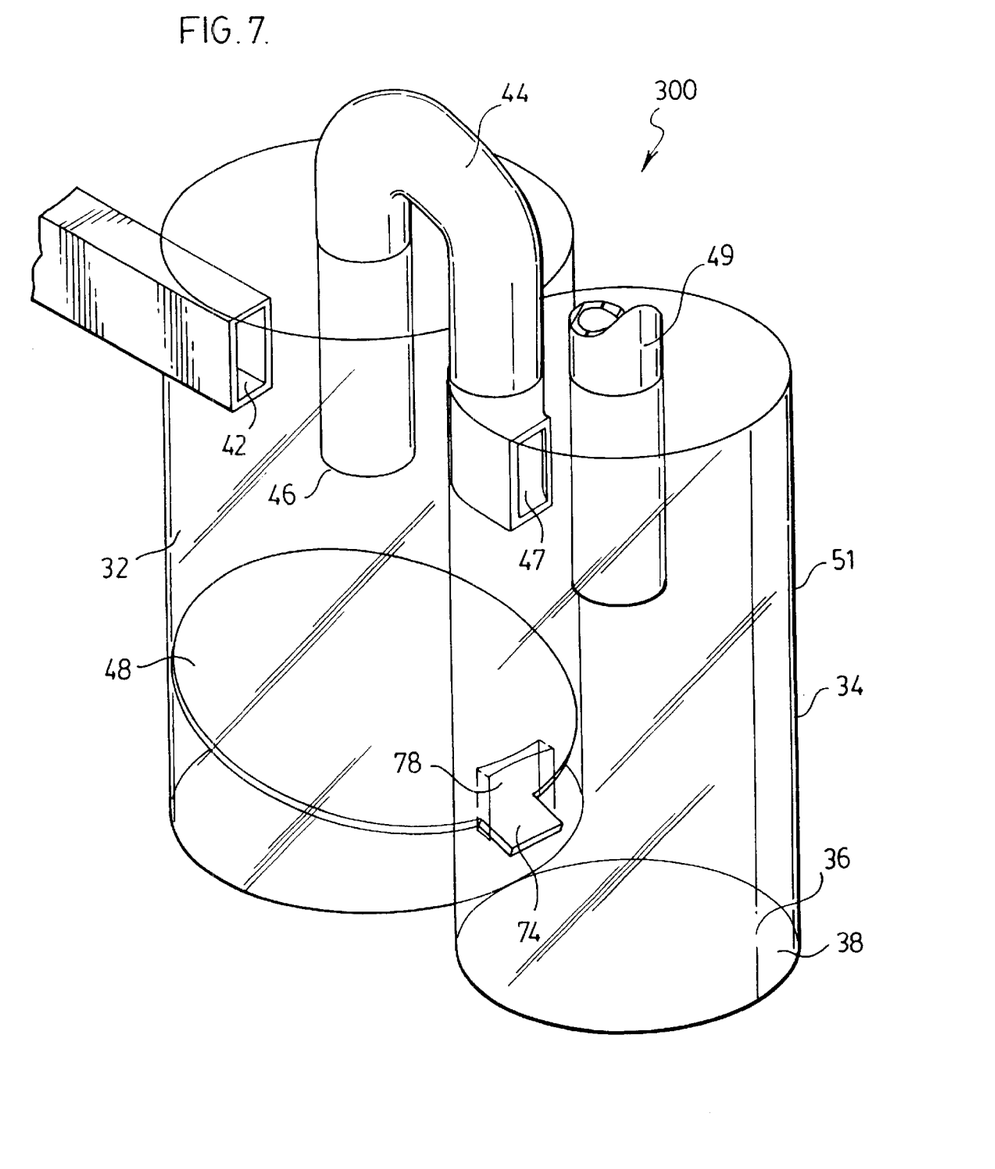
FIG. 7 is a perspective view of a further alternate embodiment of a multi-stage separator having a particle transfer member according to the present invention.

Deposited particles accumulate in second stage collector 38 and, eventually, second stage collector 38 must be emptied. In accordance with one aspect of the instant invention, second stage collector is configured so that it is emptied when first stage collector 36 is emptied. For example, as shown in FIGS. 3a, 4, 9 and 10 second stage collector may be constructed so that the contents of second stage collector 38 are emptied into first stage collector when container 66 is removed from second stage assembly 51. Alternately, as shown in FIGS. 3b, 6 and 7, second stage collector 38 is constructed so that it is emptied when first stage collector 36 is emptied (eg. by inverting container 66). Container 66 may completely contain first stage cyclone 32, or may comprise only a portion thereof. It will be understood that container 66 need only comprise first stage collector 36 and such additional portion as necessary to permit collectors 36 and 38 to be emptied and removed as described herein.

Figure 4:
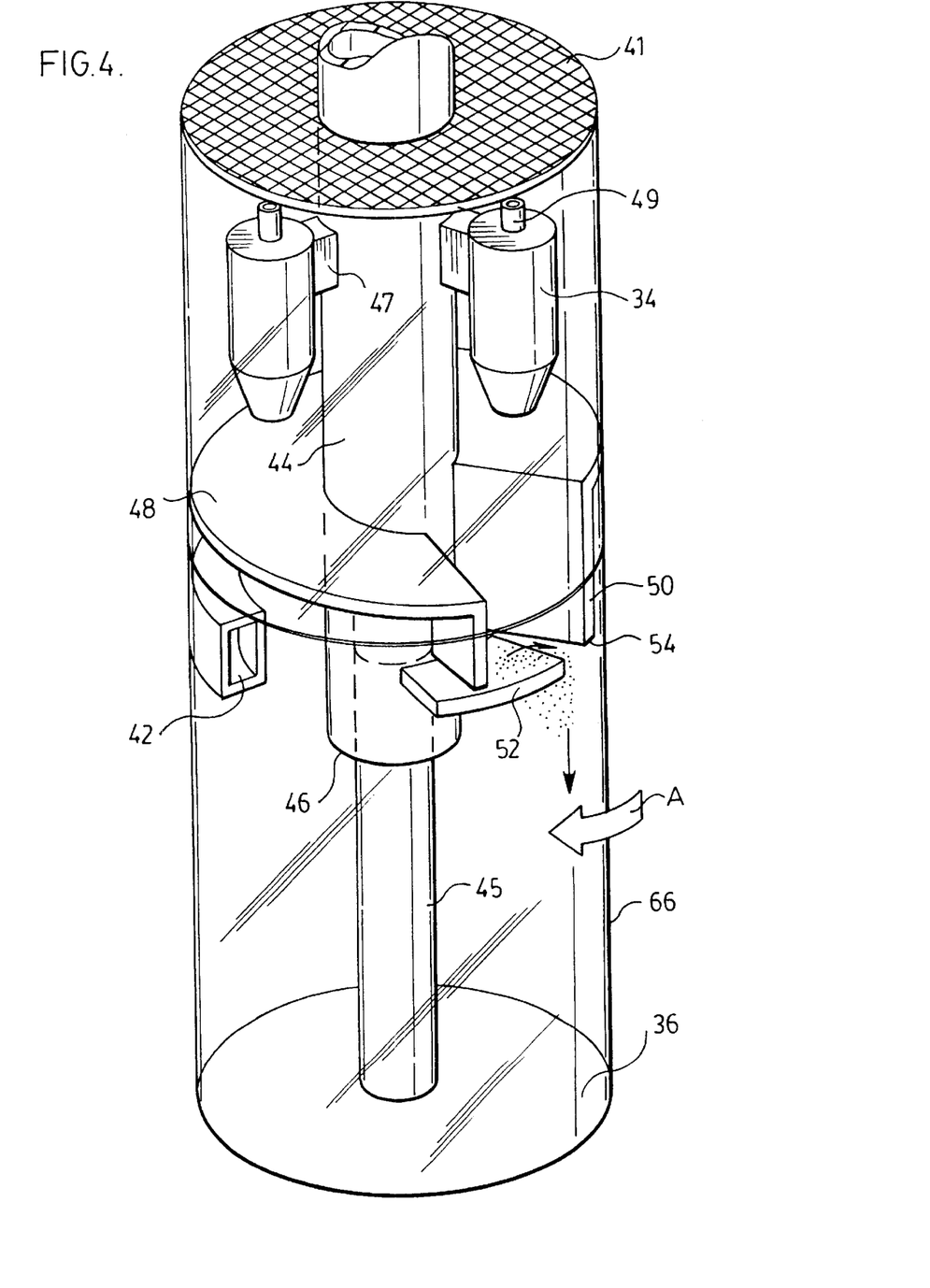
FIG. 4 is a perspective view of the multi-stage separator of FIG. 2, with the second stage collector shown in a partially open position.

As illustrated in FIG. 3a, second stage collector 38 is separable into two components, namely side walls 50 and bottom 52. Bottom 52 is affixed to the interior of container 66 while side walls 50 are affixed to second stage assembly 51, such as to first stage outlet 46 or the lower surface of particle transfer member 48. Referring to FIG. 4, to empty the contents of second stage collector 38 into first stage collector 36, container 66 is rotated in the direction of arrow A so that bottom 52 moves relative to side walls 50 thereby causing the contents of second stage collector 38 to fall into first stage collector 36 which acts as a particle receiving chamber. Container 66 may then emptied by inverting container 66 over a garbage container. Thus, only a single emptying step is required to empty separator 30.

Referring again to FIG. 4, side wall 50 preferably has a lower edge 54 which moves over the surface of bottom 52, as bottom 52 moves away from side walls 50, to sweep the surface of bottom 52 to assist in removing particles therefrom. Bottom 52 may optionally also be canted relative to the horizontal (not shown) to encourage particles thereon to slide off into first stage collector 36 when bottom 52 is moved away from side walls 50.

Figure 9:
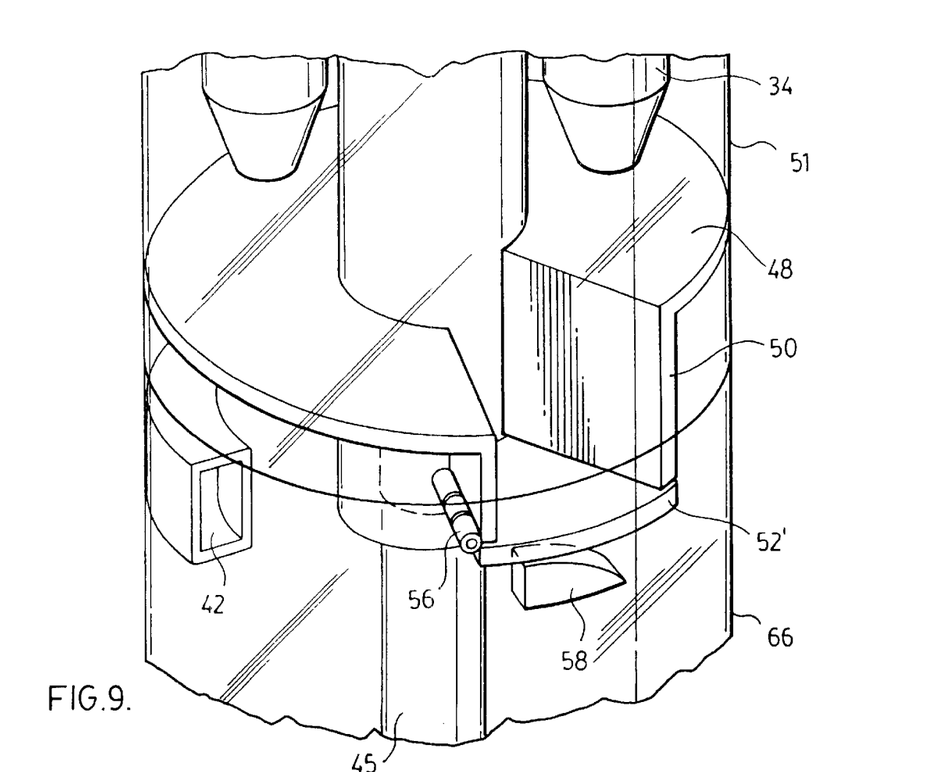
FIG. 9 is a perspective view of a further alternate embodiment of the second stage particle collector according to the present invention; and, FIG. 10 is an enlarged side view of the second stage particle collector of FIG. 9.
Figure 10:
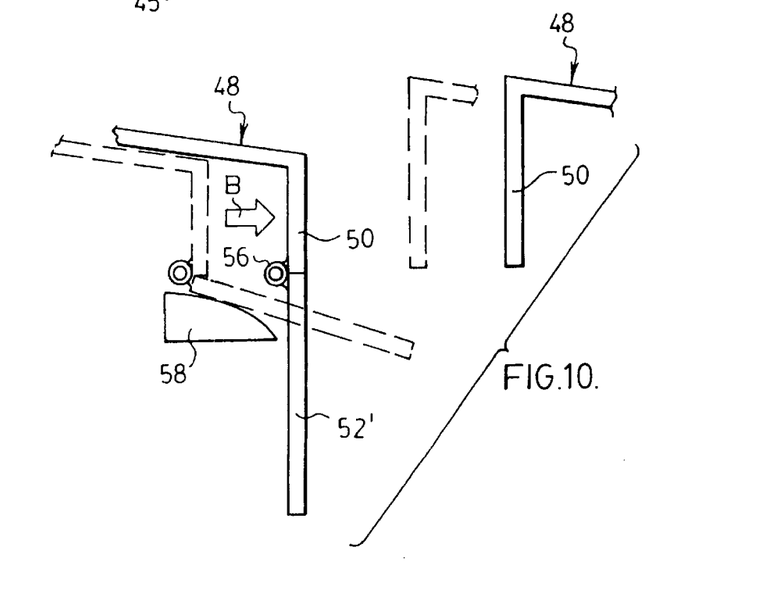

In the embodiment of FIGS. 9 and 10, bottom 52 is hingedly connected to side walls 50 by a hinge 56, rather than completely separable therefrom. A cam 58 positioned on the inner surface of container 66 is moveable (when container 66 is rotated relative to assembly 51) between a closed position in which it is positioned beneath bottom 52 (FIG. 9) and an open position in which it has been moved away from bottom 52 (solid lines in FIG. 10). When container 66 is rotated in the direction of Arrow B in FIG. 10, cam 58 is moved to a position beneath side walls 50 and bottom 52 follows cam 58 into a position beneath side walls 50 (as illustrated in dotted outline in FIG. 10), thereby closing second stage collector 38. When cam 58 is moved away from side walls 50, by the rotation of container 66, bottom 52 is permitted to swing freely to its open position due to gravity thereby dumping the contents of second stage collector 38 into first stage collector 36.

In the embodiment of FIG. 3b, second stage collector 38 is affixed to the inner surface of container 66. In this embodiment, when assembly 51 is removed from container 66, second stage collector 38 is positioned inside container 66. Thus when first stage collector 36 is emptied, eg. by inverting container 66, second stage collector 38 is also emptied.

Figure 5:
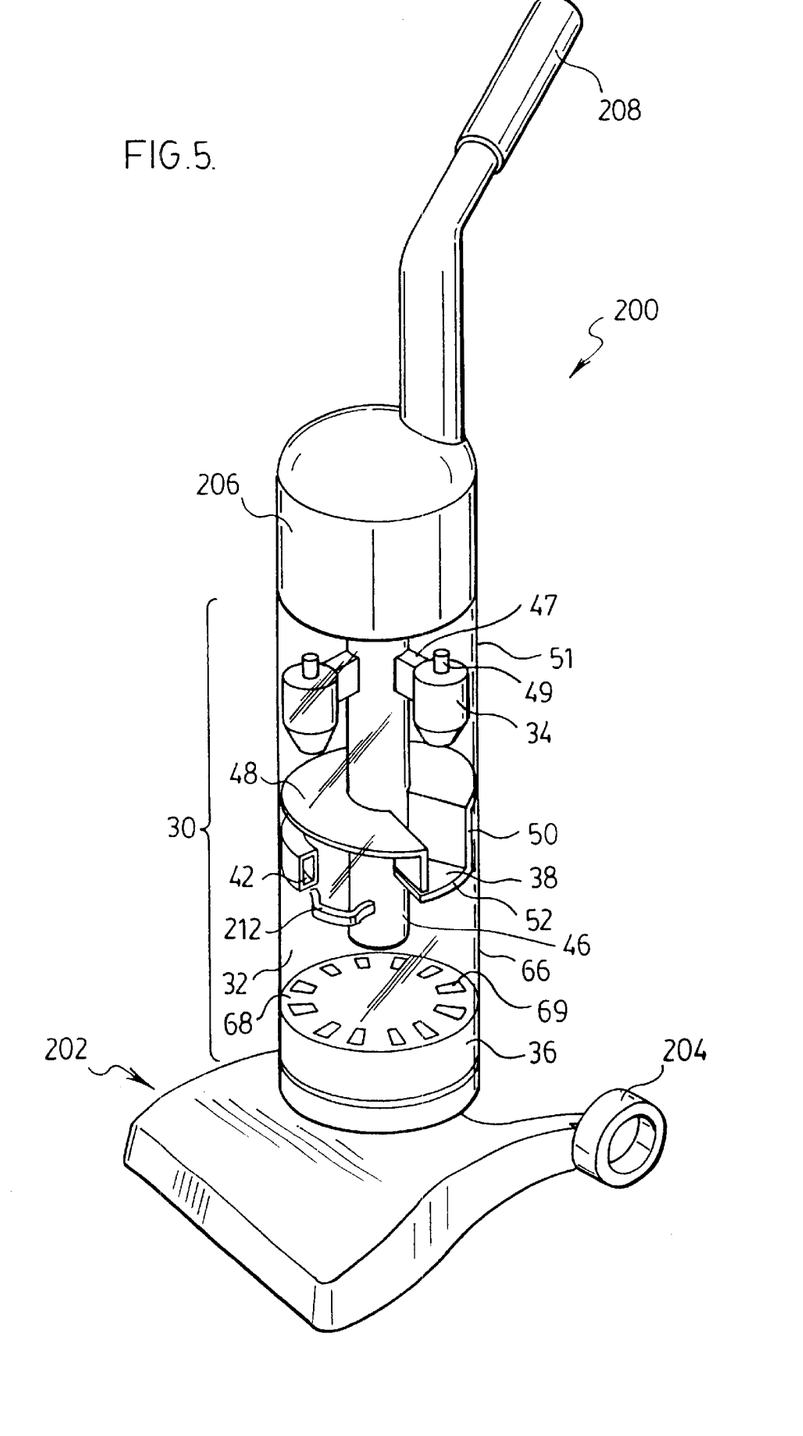
FIG. 5 is a perspective view of a household vacuum cleaner according to the present invention.

Referring to FIG. 5, upright vacuum cleaner 200 has a cleaner head 202 with rear wheels 204 and front wheels (not shown) for moving cleaner head 202 over a floor, a casing 206 which is pivotally mounted to cleaner head 202 and a handle 208 for moving of vacuum cleaner 200 over the floor. Casing 206 houses separator 30 according to the present invention. Vacuum cleaner 200 may be of any construction provided that container 66 is removable from vacuum cleaner 200 for emptying. Air inlet 42 of separator 30 communicates with a dirty air inlet (not shown) adjacent the floor in the lower surface of cleaner head 202. Container 66 is removable from main casing 206, via a handle 212, for the periodic emptying of the particles therein. It will be understood by one skilled in the art that only the lower portion of first stage cyclone 32 (i.e. the portion with collector 36) may be removable from housing 40 provided that the contents of second stage collector 38 are emptied into first stage collector 36 prior to the removal of first stage collector 36 from vacuum cleaner 200. Accordingly, neither second stage collector 38, second stage cyclones 34 nor the entirety of first stage cyclone 32 need be disposed interior of the portion of container 66 which is removable from housing 40, but rather may be fixedly located in main casing 206 above the portion of container 66 which is removable from housing 40. In this embodiment, first stage collector 36 comprises a chamber positioned below first stage cyclone 32 and separated therefrom by a plate 68 having a plurality of openings 69 therein.

In the embodiment of FIG. 6, second stage collector 38 comprises a side container 70 having an inlet at an upper portion thereof and a bottom 72 positioned at a location beneath the inlet. As shown in FIG. 6, bottom 72 is substantially planar with the bottom of first stage collector 36. Side collector is preferably a one piece assembly with container 66 so that container 66 and side container 70 are removed as a one piece assembly from casing 206. Thus container 70 may be have a lower portion 71 that is integrally formed with container 66. Alternately, the may be individually moulded and then assembled together to form a one piece unit. In either case, when first stage collector 36 is removed from casing 206 for emptying, eg. by inverting container 66, lower portion 71 of container 70 is also removed from casing 206 and emptied.

Particle transfer member 48 is configured to convey particles separated by the second stage to second stage collector 38. It will be apparent to one skilled in the art that the configuration of transfer member 48 will vary depending upon the position of second stage collector 38. For example, referring to FIG. 6, transfer member 48 comprises a disc canted to direct deposited particles laterally to side container 70. In this embodiment, guide or spout 74 is optionally provided to direct particles from transfer member 48 to side container 70. It will also be apparent that collector 38 is disposed below particle transfer member 48 so that particles may travel across transfer member 48 and be deposited into collector 38.

Referring to FIG. 7, transfer member 48 is shown used with advantage in a multi-stage separator 300 having its filtration stages arranged in a side-by-side configuration. Here, separator 300 comprises a first stage cyclone 32 and a second stage cyclone 34, the first stage and second stage being connected in series. First stage cyclone 32 has an fluid inlet 42 and a fluid outlet 46 which is in fluid flow communication with conduit 44 which is in fluid communication with second stage cyclone 34 via inlet 47. Second stage cyclone 34 has a fluid outlet 49 in communication with a conduit leading to a driving member (eg. a motor-driven fan which is not shown). Particle transfer member 48 is positioned at the bottom of first stage cyclone 32 and comprises a sloped member canted to direct deposited particles substantially laterally from first stage separator 32 to second stage collector 38 (which is also positioned at the bottom of second stage separator 34) via opening 78 in assembly 51. Thus, in essence, in this embodiment first stage collector 36 and second stage collector 38 are one and the same. A spout member 74 is optionally provided to assist in transferring particles from transfer member 48 to collector 36/38 and, thus, it is only necessary to remove collected particles from the one collector 36/38. It will be apparent that collector 36/38 is disposed below particle transfer member 48 so that particles may travel across transfer member 48 and be deposited onto collector 36/38.

Figure 8:
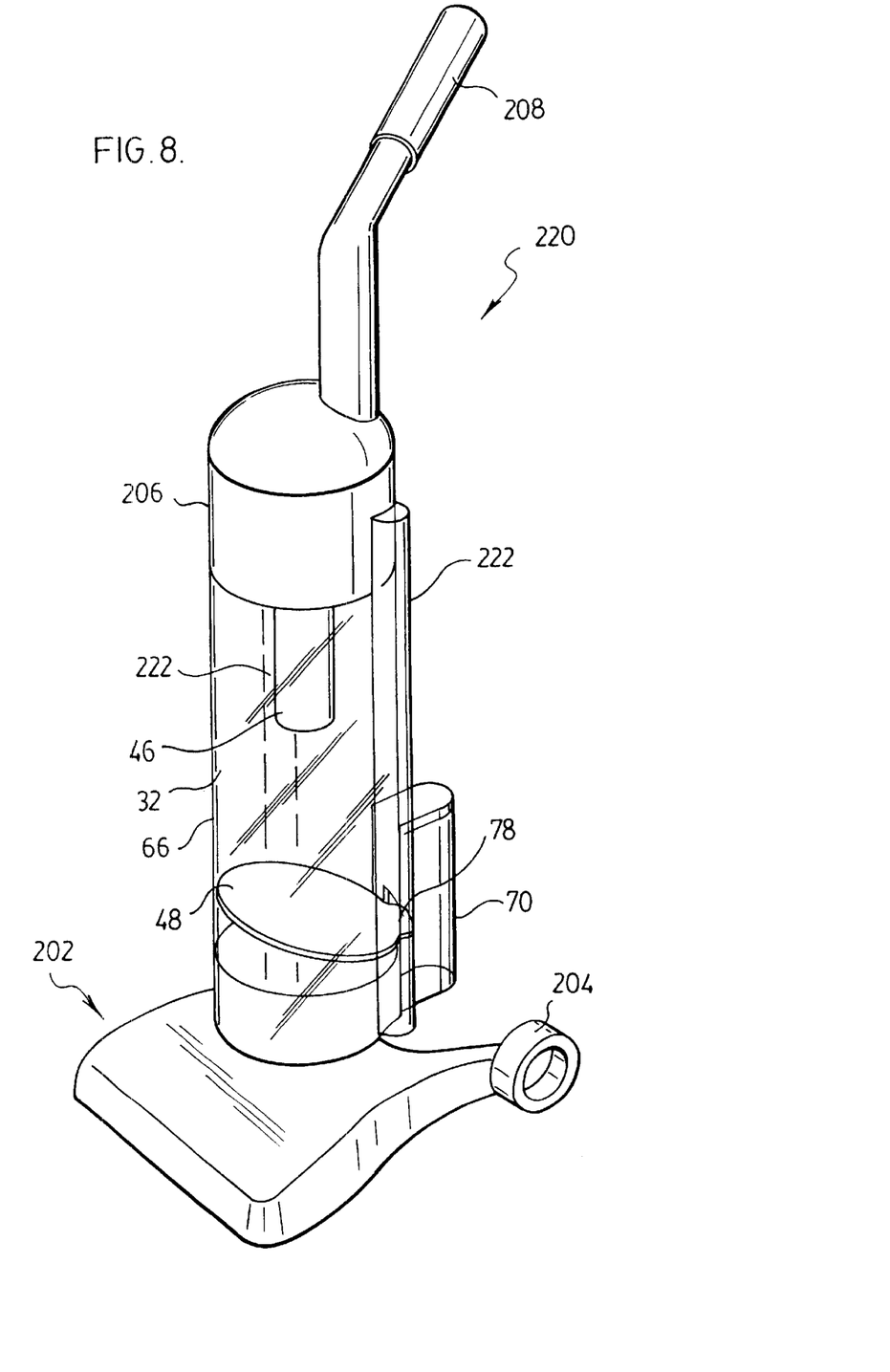
FIG. 8 is a perspective view of a further alternate embodiment of a household vacuum cleaner having a particle transfer member according to the present invention.

The present invention can also be used advantageously with a single stage filtration means wherein it is desirable to transfer the contents of the single stage collector to a more accessible position prior to emptying. For example, referring to FIG. 8, vacuum cleaner 220 has a single stage of cyclonic cleaning, namely a cyclone 32 having an adjacent external container 70. Struts 222 extend between the upper and lower portions of casing 206. Transfer member 48 transfers particles deposited by the cyclone to side container 70. Side collector 70 is separable from container 66 and casing 206, thereby permitting the user to empty particles collected by cleaner 220 simply by detaching external container 70 from the container 66 and appropriately emptying its contents.

Therefore, the transport member according to the present invention advantageously provides convenience in transporting collected particles to a collector for more convenient emptying thereof. The convenience added by the present invention permits a wider configuration of multi-stage separation devices to be used conveniently in domestic and household applications.

The collector according the present invention also advantageously increases the flexibility of various multi-stage separation mechanisms for facilitating ease-of-use and convenient operation of household vacuum cleaners. As stated above, the upstream and downstream separation stages may use any separation technique which produces separated particles that must be handled in such a way that they will not be re-entrained in fluid flowing out of the separation stage (ie. the stage is capable of depositing and storing separated particles in a reusable container) such as, for example, a cyclone separator, a Prandtl layer turbine, an electrostatic filter, a fibre filter or the like.

While the above description constitutes the preferred embodiments, it will be appreciated that the present invention is susceptible to modifications and change without departing from the fair meaning of the proper scope of the accompanying claims.

What is claimed is:

1. A separator for separating entrained particles from a fluid flow, the separator comprising:
   (a) a first particle separation member;
   (b) a reusable particle collector disposed beneath the particle separation member, the reusable particle collector having a moveable member movably mounted between a closed position and an open position;
   (c) a second particle separation member, and,
   (d) a second particle receiving chamber positioned for receiving particles separated from the fluid flow by the second particle separation member and disposed beneath the reusable particle collector, wherein when the moveable member moves from its closed position to its open position, particles collected in the particle collector are substantially transferred to the second particle receiving chamber.

2. The separator of claim 1 wherein the first particle separation member has a wall and a portion of the wall forms a portion of the reusable particle collector.

3. A separator comprising:
   (a) an inlet in fluid flow communication with a source of fluid having particles therein;
   (b) a particle separation member;
   (c) a first particle collector disposed below the particle separation member; and,
   (d) a particle transfer member positioned between the particle separation member and the particle collector, at least a portion of the particle transfer member is angled downwardly to the first particle collector whereby particles separated by the particle separation member are conveyed to the particle collector.

4. The separator of claim 3 wherein at least a portion of the particle transfer member is a ramp.

5. The separator of claim 3 wherein the first particle separation member is chosen from the group consisting of a cyclone, a Prandtl layer turbine and an electrostatic filter.

6. The separator of claim 3 wherein the separator comprises a second particle separation member upstream of the particle separation member and the first particle collector is positioned in the second particle separation member.

7. The separator of claim 6 wherein the second particle separation member has a second particle collector which is removably mounted in a casing and the first particle collector is constructed to empty into the second particle collector when the second particle collector is removed from the casing.

8. The separator of claim 3 wherein the first particle collector is disposed beside the second particle separation member.

9. The separator of claim 3 wherein the particle transfer member comprises a pivotally mounted disc.

10. A separator for separating entrained particles from a fluid flow, the separator comprising:
   (a) a housing having a first separation stage and a first particle collector in communication with the first separation stage;
   (b) a second separation stage;
   (c) a second particle collector in communication with the second separation stage and positioned in the housing, the first and second particle collectors are configured such that the second particle collector is emptied when the first particle collector is emptied; and, (d) a cleaning head having a dirty air inlet and the separator is connectable in fluid flow communication with the dirty air inlet wherein the separator comprises a filtration stage of a vacuum cleaner.

11. The separator of claim 10 wherein the second separation stage is positioned downstream from the first separation stage.

12. The separator of claim 10 wherein the second particle collector has a collector housing including a bottom panel and the bottom panel is movably mounted between a closed position in which the second particle collector collects material separated by the second separation stage and an open position in which the second particle collector is emptied.

13. The separator of claim 10 wherein each of the first and second separation stage comprise at least one cyclone.

14. The separator of claim 10 wherein the first separation stage comprises a cyclone and the second separation stage comprises a plurality of cyclones.

15. The vacuum cleaner of claim 10 wherein the second particle collector is mounted beside the first particle collector.

16. The vacuum cleaner of claim 10 wherein the second particle collector is mounted above the first particle collector.

17. The vacuum cleaner of claim 16 wherein the first particle collector is positioned at the bottom of a cyclone container and the second particle collector is mounted inside the cyclone container.

18. A separator comprising:
(a) an inlet in fluid flow communication with a source of fluid having particles therein,
(b) a first particle separation member;
(c) a particle transfer member positioned to transfer material separated by the first particle separation member;
(d) a second particle separation member upstream of the first particle separation member; and,
(e) a second particle collector positioned to receive material separated by the second particle separation member, the second particle collector is removably mounted in a casing.

19. The separator of claim 18 wherein the particle transfer member is a ramp.

20. The separator of claim 18 further comprising a first particle separation member positioned below the first particle separation member wherein the particle transfer member transfers material separated by the first particle separation member to the first particle separation member and the first particle collector is configured such that material collected in the first particle collector is emptied into the second particle collector.

21. The separator of claim 20 wherein the second particle separation member has a wall and a portion of the wall forms a portion of the first particle collector.

22. A separator comprising:
(a) an inlet in fluid flow communication with a source of fluid having particles therein;
(b) a first particle separation member having a wall;
(c) a first particle collector positioned to receive material separated by the first particle separation member;
(d) a second particle separation member downstream of the first particle separation member; and,
(e) a second particle collector positioned to receive material separated by the second particle separation member, wherein a portion of the wall forms a portion of the second particle collector.

* * * * *